(12) United States Patent
Pate

(10) Patent No.: US 6,294,096 B1
(45) Date of Patent: Sep. 25, 2001

(54) WATER DECHLORINATING SYSTEM

(76) Inventor: Michael Pate, 4261 Brentwood Cir., Concord, CA (US) 94521

( * ) Notice: Subject to any disclaimer, the term of this patent is extended or adjusted under 35 U.S.C. 154(b) by 0 days.

(21) Appl. No.: 09/333,107

(22) Filed: Jun. 15, 1999

(51) Int. Cl.[7] .................................................. C02F 1/70
(52) U.S. Cl. ......................... 210/749; 210/757; 210/790; 210/198.1
(58) Field of Search .................................. 210/749, 757, 210/198.1, 790, 206; 422/261

(56) References Cited

U.S. PATENT DOCUMENTS

| | | | |
|---|---|---|---|
| 3,650,471 | 3/1972 | Sutton | 239/67 |
| 4,402,531 | 9/1983 | Kennedy, Jr. | 285/14 |
| 4,805,862 | 2/1989 | Wissman | 248/229 |
| 4,816,177 | * 3/1989 | Nelson et al. | 210/749 |
| 5,152,464 | * 10/1992 | Farley | 210/449 |
| 5,350,512 | 9/1994 | Tang | 210/199 |
| 5,788,858 | 8/1998 | Acernese et al. | 210/257.2 |
| 5,810,044 | 9/1998 | Saidi | 137/272 |
| 6,117,316 | * 9/2000 | Burton | 210/198.1 |

* cited by examiner

Primary Examiner—Ivars Cintins
(74) Attorney, Agent, or Firm—Thomas R. Lampe

(57) ABSTRACT

An apparatus and a method for dechlorinating water being discharged from a chlorinated water supply system. The water flows through a housing interior and impacts a container having openings therein. The container contains dechlorinating tablets and the tablets gradually erode under the force of water during discharge to dechlorinate the water.

9 Claims, 4 Drawing Sheets

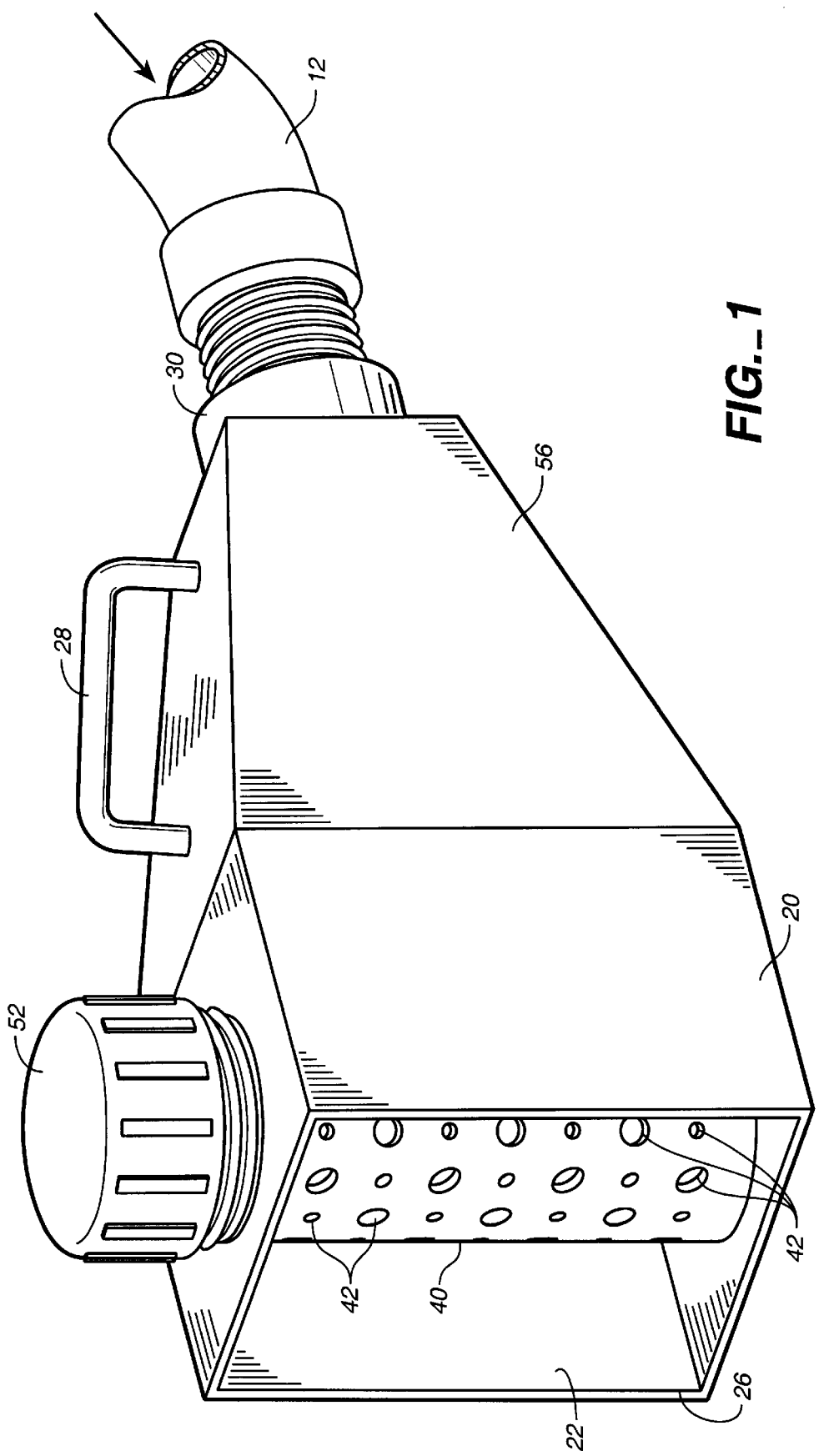
FIG._1

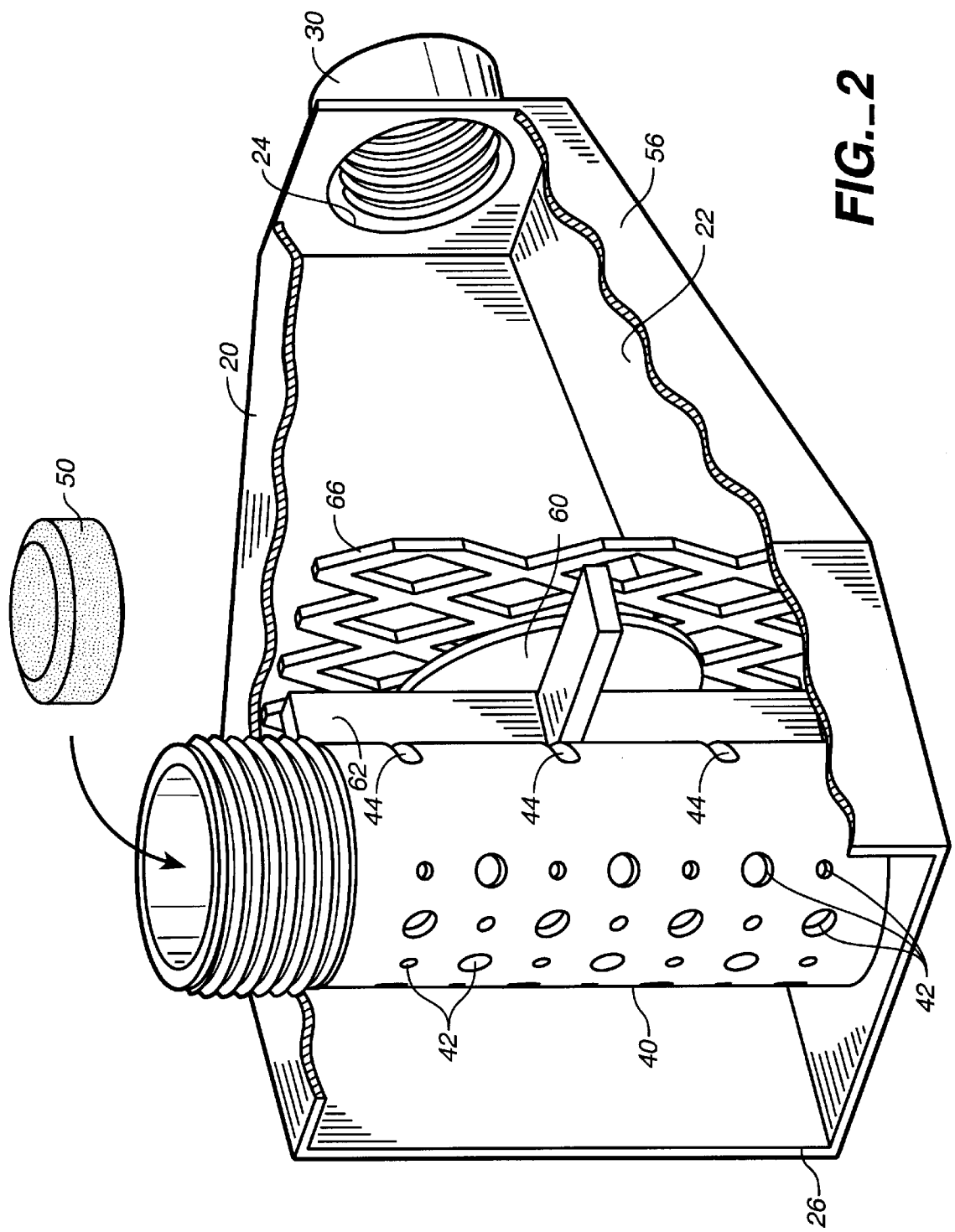
FIG._2

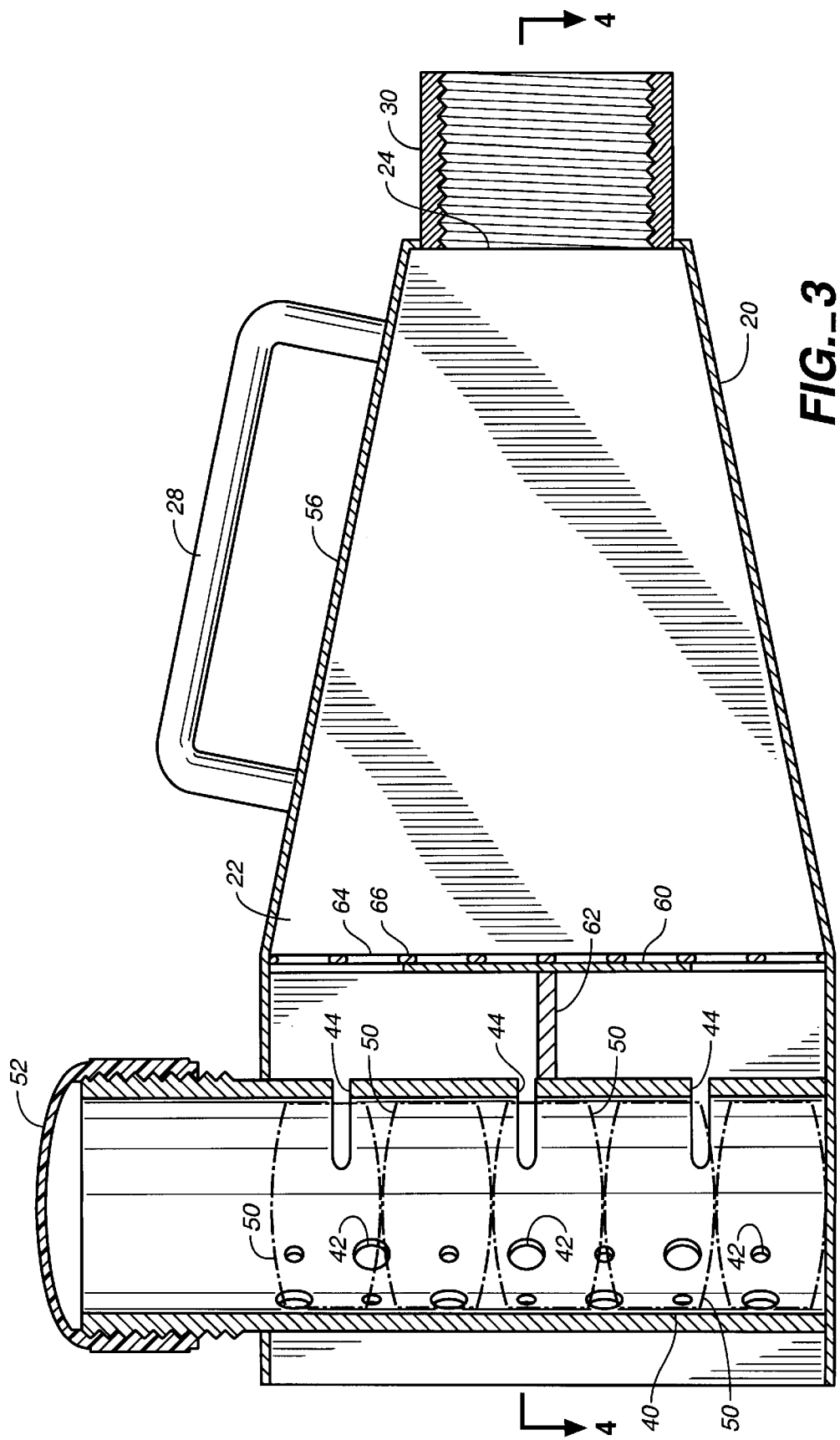
FIG._3

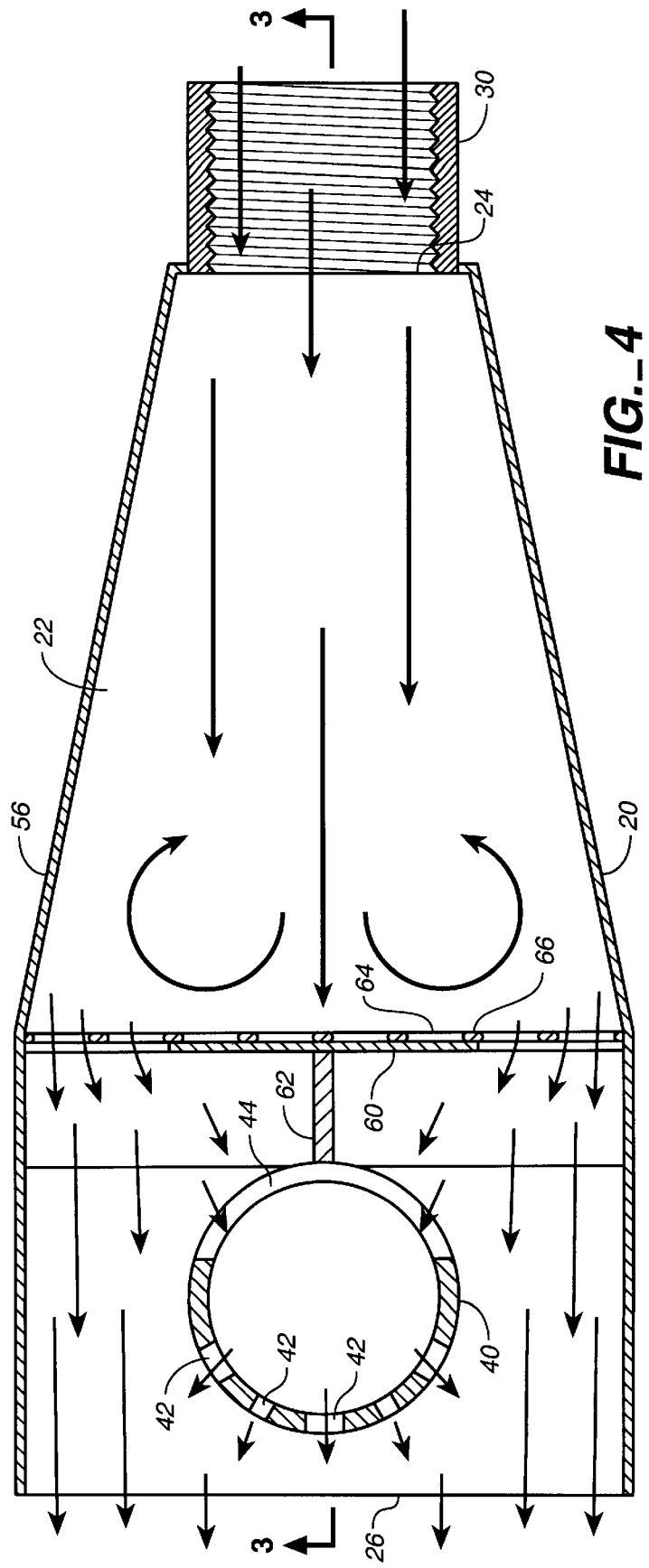
FIG._4

WATER DECHLORINATING SYSTEM

TECHNICAL FIELD

This invention relates to apparatus for receiving water from a chlorinated water supply system to dechlorinate the water. The invention also encompasses a method.

BACKGROUND OF THE INVENTION

Water treatment usually involves the use of some form of chlorine. The discharge of chlorinated water from water supply systems, for example from a hydrant of the system, can cause harm to the environment and laws restricting or preventing such discharge are commonplace in the United States and elsewhere.

As a consequence, a number of approaches have been devised in an attempt to dechlorinate water at or prior to discharge. One well known agent for neutralizing chlorine is sodium thiosulfate. It is known to form a solution including such material at a water supply system discharge outlet, for example the outlet of a fire hydrant, and attempt to meter drip or flow of the solution into the water being discharged. This is often ineffective and difficult to monitor and it is virtually impossible to ensure that an appropriate amount of solution is added to the discharge water. Furthermore, crystallization within the solution is a common occurrence and such crystallization interferes with or even prevents application of the solution. In general, regulating the addition of the solution to the flow of water is a difficult and inefficient process.

It is known to form dechlorinating material into tablets which are engaged by the water being discharged. Examples of such tablets are tablets sold by Exceltec under the trademark D-Chlor. It is known to position such tablets in a mat or screen for engagement by the discharged water, however, these approaches are not completely satisfactory in that erosion of the tablets, and thus introduction of the dechlorinating neutralization agent in the water, is very difficult to control. A dangerous situation can be created if inadequate or improper mixing of the dechlorinating agent and discharged water takes place.

The following patents are also considered of some pertinence to the issue of the state of the prior art in this field: U.S. Pat. No. 5,788,858, issued Aug. 4, 1998, U.S. Pat. No. 4,402,531, issued Sep. 6, 1983, U.S. Pat. No. 3,650,471, issued Mar. 21, 1972, U.S. Pat. No. 5,810,044, issued Sep. 22, 1998, U.S. Pat. No. 4,805,862, issued Feb. 21,1989, U.S. Pat. No. 5,350,512, issued Sep. 27, 1994.

None of the patents cited above disclose the invention as described and claimed herein.

DISCLOSURE OF INVENTION

The present invention relates to a system which is relatively simple and can be used in an efficient manner. The apparatus of the system is readily portable and can be attached quickly to a fire hydrant, hose or other outlet of a chlorinated water supply system.

The system employs dechlorinating tablets and the apparatus is so constructed as to provide for erosion of the tablets by the flowing stream of discharge water in a highly controlled, regulated manner, avoiding the necessity of having a person on hand at all times to monitor operation. The apparatus can be hooked up and the site left unmonitored by an individual for an extended period of time. The structural components of the apparatus cooperate to avoid too rapid an erosion of the tablets while ensuring complete continuous mixing of the dechlorinating agent with the discharged water.

The apparatus includes a housing defining a housing interior and having a water inlet and a water outlet, the water inlet and the water outlet communicating with the housing interior and being spaced from one another.

Connector means is provided for connecting the apparatus to structure of a chlorinated water supply system whereby water can be introduced into the housing interior from the water supply system.

A container is located within the housing interior between the water inlet and the water outlet and defines a plurality of container openings. The container is for holding one or more dechlorinating tablets and for positioning the dechlorinating tablets in the flow path of water passing between the water inlet and the water outlet whereby water will pass through the container openings and contact the dechlorinating tablets prior to exiting the housing interior through the water outlet.

The system also encompasses a method of dechlorinating water exiting a chlorinated water supply system. The method includes the step of introducing water from the chlorinated water supply system into the interior of a housing and then flowing the water within the housing interior toward a water outlet in fluid-flow communication with the interior of the housing, the water moving along a flow path.

A container having a container interior and a plurality of openings communicating with the container interior is positioned in the flow path and dechlorinating tablets are placed in the container.

While the water is flowing in the flow path at least a portion thereof is passed through the openings of the container to contact the dechlorinating tablets.

The water is discharged after contact with the dechlorinating tablets.

Other features, advantages, and objects of the present invention will become apparent with reference to the following description and accompanying drawings.

BRIEF DESCRIPTION OF DRAWINGS

FIG. 1 is a perspective view of apparatus constructed in accordance with the teachings of the present invention attached to a fire hose;

FIG. 2 is a perspective view of the apparatus with a portion thereof being broken away to disclose interior structural components thereof and also illustrating a dechlorinating tablet being added to a container comprising a structural component of the apparatus;

FIG. 3 is a sectional view taken along the line 3—3 in FIG. 4; and

FIG. 4 is a sectional view taken along the line 4—4 in FIG. 3.

BEST MODE FOR CARRYING OUT THE INVENTION

Referring now to the drawings, apparatus constructed in accordance with the teachings of the present invention is illustrated. The apparatus is for receiving water from a chlorinated water supply system to dechlorinate the water. FIG. 1 shows the apparatus connected to the discharge end of a fire hose 12 which in turn may lead from a fire hydrant (not shown). The apparatus may also suitably be attached directly to a hydrant and be supported thereby at the outlet opening of the hydrant.

The apparatus may be formed of any suitable material such as steel and it is highly portable, being of unitary construction and capable of being transported and positioned manually at a desired outlet of a chlorinated water supply system.

The apparatus includes a housing 20 defining a housing interior 22 and having a water inlet 24 and a water outlet 26. The water inlet and the water outlet communicate with the housing interior and are spaced from one another. A carrier handle 28 is affixed to the housing to facilitate carrying of the apparatus.

Attached to the housing and extending outwardly therefrom is connector means in the form of a threaded coupling 30 employed to threadedly connect the apparatus to a fire hydrant or a hose leading from a hydrant, for example.

Located within the housing interior and rigidly attached to the housing is a container 40 in the form of a cylinder having circular openings 42 and other openings in the shape of slits 44 formed therein and establishing communication between the housing interior and the interior of the container. The slits are oriented in a direction opposed to the direction of flow of water from the water inlet 24 to the water outlet 26; that is, the slits are facing in an upstream direction, while the openings 42 are oriented in a downstream direction facing toward water outlet 46.

The container 40 is for the purpose of holding a stack of dechlorinating tablets 50, for example D-Chlor tablets made available by Exceltec. The term tablet as employed herein is in the broad sense meaning any solid unit or block of dechlorinating material. A cover 52 is threadedly engaged with the top open end of container 40 to allow for the ready insertion of tablets 50 into the container interior when the cover is removed. This is shown in FIG. 2. The bottom end of the container is secured to the housing and is closed in the arrangement illustrated.

Housing 20 includes a diffuser portion 56 which is disposed between the water inlet 24 and container 40. The housing interior at the diffuser portion increases in size in the direction of water flow from the water inlet toward the container to diffuse water flow.

At the juncture of the diffuser portion with the rest of the housing, baffle means is provided. The baffle means disrupts water flow and agitates the water prior to contact thereof with the container. The action of the diffuser portion and the baffle means on the water is illustrated schematically in FIG. 4 by means of arrows.

The baffle means includes a baffle plate 60 rigidly connected to the container and the housing by a plate support member 62. The plate has a flat planar surface 64 facing upstream, the surface 64 extending in a plane perpendicular to the direction of water flow from the water inlet toward the container. The plate 60 is positioned directly in front of the container to ensure that the container does not receive the full impact of the water during water flow. This in turn limits or controls the rate of water flow through the container through slits 44.

Another component of the illustrated baffle means is a screen or foraminous plate 66 extending across the housing interior and parallel and adjacent to the baffle member or plate 60.

In operation, the apparatus is connected by coupling 30 to a fire hydrant or other chlorinated water supply outlet either directly or indirectly as by means of fire hose 12. Water is introduced from the chlorinated water supply system into the housing interior 12, as illustrated schematically in FIG. 4. The water flows within the housing interior toward the water outlet 26 with a portion of the water flowing around the container 40 and a portion flowing through the container by virtue of the openings 42, 44. Prior to reaching the container 40 the discharged water is in a highly agitated state due to the action of the diffuser portion 56, baffle plate 60 and screen 66, the baffle plate 60 also serving to guard or shield the container from the full force of the flow which in municipal water systems, for example, can be at a quite high rate.

Controlled erosion of tablets 50 will occur and the portion of water flow exiting the container has some of the tablet in solution. This portion combines with the water passing around the streamlined outer surface of the cylindrical container at the point of discharge.

What is claimed is:

1. Apparatus for receiving water from a chlorinated water supply system to dechlorinate said water, said apparatus comprising, in combination:

a housing defining a housing interior and having a water inlet and a water outlet, said water inlet and said water outlet communicating with said housing interior and being spaced from one another;

connector means for connecting the apparatus to structure of a chlorinated water supply whereby water can be introduced into said housing interior from said water supply system;

a container rigidly attached to said housing and located within said housing interior between said water inlet and said water outlet and defining a plurality of container openings, said container for holding one or more dechlorinating tablets and for positioning said dechlorinating tablets in the flow path of water passing between said water inlet and said water outlet whereby a first portion of said water will pass through said container openings and contact said dechlorinating tablets prior to exiting said housing interior through said water outlet, said container and said housing defining spaces allowing for the passage of a second portion of said water around said container, said housing including a diffuser portion disposed between said water inlet and said container, said housing interior at said diffuser portion gradually increasing in size in the direction of water flow from said water inlet toward said container to diffuse said water flow; and baffle means located between said water inlet and said container in said housing interior and partially blocking said housing interior between said water inlet and said container for disrupting water flow and agitating the water prior to contact thereof with the container, said baffle means including a baffle member rigidly connected to said housing adjacent to said container and having a baffle surface engageable by water from said water inlet to lessen the impact of water from said water inlet on said container.

2. The apparatus according to claim 1 wherein said baffle means additionally includes a screen secured to said housing and extending across the housing interior between said container and said water inlet.

3. The apparatus according to claim 1 wherein said baffle means additionally includes a screen extending across the housing interior adjacent to said baffle member.

4. The apparatus according to claim 1 wherein said container has an open end for insertion of dechlorinating tablets, said apparatus additionally comprising a cover for selectively closing said open end.

5. The apparatus according to claim 1 wherein said apparatus is of unitary, portable construction and includes at least one carrying handle.

6. The apparatus according to claim 1 wherein said connector means comprises a threaded coupling for connection to a fire hydrant or a hose.

7. The apparatus according to claim 1 wherein said plurality of container openings includes slits formed in said container facing in a direction opposed to the direction of said water flow.

8. A method of dechlorinating water exiting a chlorinated water supply system, said method comprising the steps of:

introducing water from said chlorinated water supply system into the interior of a housing;

flowing said water within said housing interior toward a water outlet in fluid-flow communication with the interior of said housing, said water moving along a flow path;

rigidly positioning a container having a container interior and a plurality of openings communicating with said container interior in the flow path;

placing one or more dechlorinating tablets in said container;

diffusing the water flowing through the interior of the housing at a location upstream from said container;

while said water is flowing in said flow path, passing a first portion thereof through the openings of said container to contact said dechlorinating tablets;

while said water is flowing in said flow path and after diffusing thereof, passing a second portion thereof through one or more spaces located between the container and housing;

while said water is flowing in said flow path and after diffusing thereof, impacting said water on an impact surface to lessen the impact of said water on said container;

combining said first and second portions; and discharging the water after contact with the dechlorinating tablets while combining said first and second portions.

9. The method according to claim 8 wherein said chlorinated water supply system includes a fire hydrant, said method including the step of connecting said housing to said fire hydrant prior to the step of flowing said water within said housing interior.

\* \* \* \* \*